United States Patent [19]

Shimozato et al.

[11] Patent Number: 4,774,287
[45] Date of Patent: Sep. 27, 1988

[54] HEAT-RESISTANT COPOLYMER OF ALPHA-METHYLSTYRENE AND ACRYLONITRILE, PROCESS FOR PREPARING THE SAME, AND THERMOPLASTIC RESIN COMPOSITION CONTAINING THE SAME

[75] Inventors: Yasuyuki Shimozato; Syuji Tsuchikawa; Shinichi Kimura, all of Yokkaichi; Masahiko Noro, Yokohama, all of Japan

[73] Assignee: Japan Synthetic Rubber Co., Ltd., Tokyo, Japan

[21] Appl. No.: 947,284

[22] Filed: Dec. 29, 1986

Related U.S. Application Data

[62] Division of Ser. No. 724,543, Apr. 18, 1985, Pat. No. 4,659,790.

[30] Foreign Application Priority Data

Jun. 5, 1984 [JP] Japan ................................ 59-113853
Jun. 29, 1984 [JP] Japan ................................ 59-133056

[51] Int. Cl.$^4$ ............................................. C08L 51/04
[52] U.S. Cl. ........................................ 525/86; 525/70
[58] Field of Search .................................... 525/70, 86

[56] References Cited

U.S. PATENT DOCUMENTS

| | | | |
|---|---|---|---|
| 3,010,936 | 11/1961 | Irvin | 525/86 |
| 3,270,777 | 9/1966 | Thompson | 525/86 |
| 4,361,684 | 11/1982 | Minematsu et al. | 526/87 |
| 4,427,832 | 1/1984 | Yagi et al. | 525/238 |
| 4,526,928 | 7/1985 | Mathumoto et al. | 526/80 |

FOREIGN PATENT DOCUMENTS

| | | | |
|---|---|---|---|
| 0042572 | 12/1981 | European Pat. Off. | |
| 0041703 | 12/1981 | European Pat. Off. | |
| 0043613 | 1/1982 | European Pat. Off. | 525/86 |
| 0078007 | 6/1980 | Japan | 526/80 |
| 103211 | 8/1981 | Japan | |

*Primary Examiner*—Wilbert J. Briggs, Sr.
*Attorney, Agent, or Firm*—Oblon, Fisher, Spivak, McClelland & Maier

[57] ABSTRACT

A heat-resistant copolymer obtained by copolymerizing (A) 72-82 parts by weight of α-methylstyrene and (B) 26-18 parts by weight of acrylonitrile, characterized in that the copolymer contains (a) 0-15% by weight of monomer chain —[(A)-(A)-(A)]—, (b) 50% by weight or more of monomer chain —[(A)-(A)-(B)]—, and (c) 50% by weight or less of monomer chain —[(B)-(A)-(B)]—, the total of (a), (b) and (c) being 100% by weight. This copolymer is excellent in heat stability and moldability when molded at high temperatures, and the blending of this copolymer with other thermoplastic resins gives thermoplastic resins with excellent heat resistance.

30 Claims, 1 Drawing Sheet

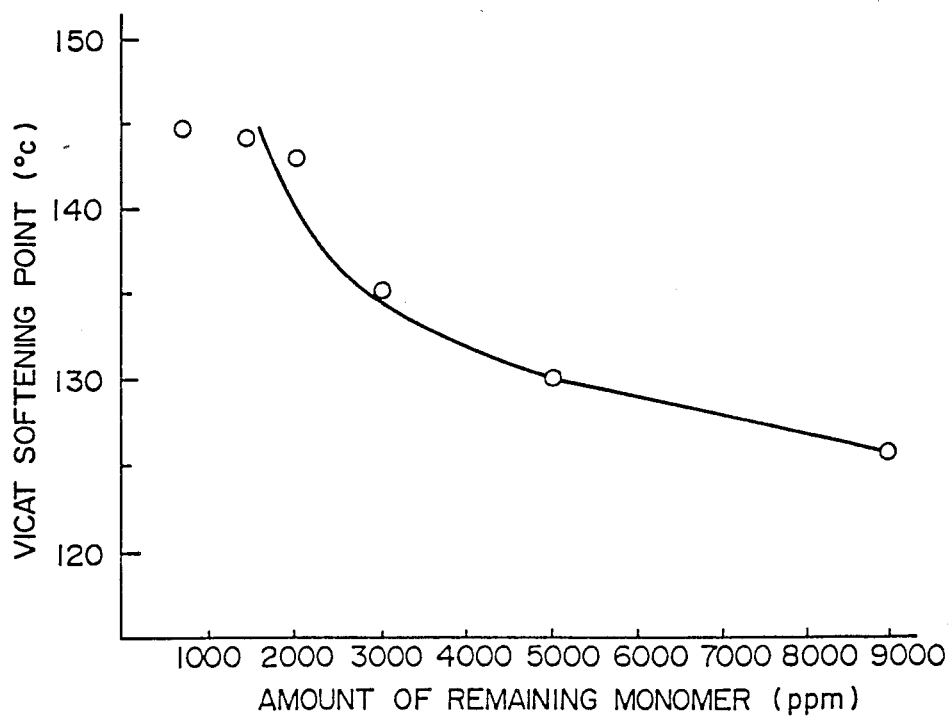

HEAT-RESISTANT COPOLYMER OF ALPHA-METHYLSTYRENE AND ACRYLONITRILE, PROCESS FOR PREPARING THE SAME, AND THERMOPLASTIC RESIN COMPOSITION CONTAINING THE SAME

This is a division of application Ser. No. 724,543, filed Apr. 18, 1985, now U.S. Pat. No. 4,659,790.

This invention relates to an α-methylstyreneacrylonitrile copolymer resin showing excellent heat stability and moldability and being not deteriorated in its heat resistance when molded at high temperatures, and to a process for producing such a copolymer resin.

Thermoplastic resins produced by graft-copolymerizing styrene and acrylonitrile on a polybutadiene rubber have become widely used as resins (ABS resin) having excellent impact and heat resistance. However, rendering the performance higher in the fields of light electrical appliances and automobiles results in a strong desire of enchancing the heat resistance of structural materials. In order to meet such a desire, attempts have been made to improve the properties of the graft copolymer by replacing the styrene by α-methylstyrene. Generally, an increase of the α-methylstyrene content results in an improvement of the heat resistance of the resin, but on the other hand, the impact strength and moldability of the resin are greatly deteriorated, and thus, the no resin having a well-balanced quality desired commercially can be obtained.

This is because the heat resistance, impact resistance and moldability of α-methylstyrene-containing ABS resin depend on the proportions of α-methylstyrene and acrylonitrile which are polymerizing components (which proportions affect the glass transition temperature of the polymer) and the molecular weight of these components. In other words, an increase in the glass transition temperature leads to an improvement in heat resistance and a reduction of impact resistance and moldability on one hand, and an increase of molecular weight results in an improvement of impact strength and a reduction of moldability on the other hand. Therefore, it is impossible to obtain a resin satisfying simultaneously all of heat resistance, impact resistance and processability according to conventional methods in which merely the proportions of the components are varied or the molecular weight of the polymer is varied.

A method of mixing an α-methylstyrene-acrylonitrile copolymer with an acrylonitrile-butadiene-styrene copolymer is also used for improving the heat resistance of a rubber-modified thermoplastic resin including ABS resin. These thermoplastic resins are now commonly used as interior materials in the fields of automobiles and light electrical appliances, but they still involve the problem of deformation in use at high temperatures. A high molding temperature is required for obtaining a large-sized article by injection molding, and in this case, heat stability of the resin is especially required.

In order to solve said problem, there is a method by which the α-methylstyrene content in the resin is increased as much as possible (see Japanese Patent Publication No. 12,300/83, etc.). This method can improve the heat resistance but causes a reduction of heat stability of the resin during molding at a high temperature.

In the copolymerization of α-methylstyrene (αMS) and acrylonitrile (AN), as disclosed in Japanese Patent Publication No. 33,661/70, the polymerization conversion decreases as the amount of αMS increases from the ratio of αMS:AN=70:30 (azeotropic composition). Therefore, even if the polymerization is carried out using a monomer composition having a greater αMS content than that in the azeotrope composition in order to produce a copolymer with a high heat resistance, thereby obtaining a copolymer having a higher αMS content, it is found that when the monomer composition has a high αMS content the polymerization conversion is low and unreacted monomer remains in a large quantity in the resin obtained from the conventional recovery method, so that it is still impossible to obtain a resin composition with high heat resistance by this method.

The object of the present invention is to provide an α-methylstyrene-acrylonitrile copolymer resin having a low deformation at high temperature and a high heat stability during molding at a high temperature without impairing the heat resistance of the resin, a process for producing said copolymer resin, and a thermoplastic resin composition containing said resin.

According to the present invention, there is provided a heat-resistant copolymer (hereinafter referred to as heat-resistant copolymer (I)) obtained by copolymerizing (A) 74-82 parts by weight of α-methylstyrene and (B) 26-18 parts by weight of acrylonitrile, characterized in that the copolymer contains (a) the monomer chain ${(A)—(A)—(A)}$ in a proportion of 0-15% by weight, (b) the monomer chain ${(A)—(A)—(B)}$ in a proportion of 50% by weight or more and (c) the monomer chain ${(B)—(A)—(B)}$ in a proportion of 50% by weight or less (the total of said (a), (b) and (c) being 100% by weight).

The present invention also provides a process for producing a heat-resistant copolymer (I) which comprises charging and mixing α-methylstyrene and acrylonitrile at a weight ratio of α-methylstyrene to acrylonitrile of less than 9, emulsifying the mixture, initiating the polymerization of these monomers at a temperature of 67°-90° C., and continuing the polymerization in said temperature range while continuously or intermittently supplying acrylonitrile or a mixture of α-methylstyrene and acrylonitrile so that the α-methylstyrene to acrylonitrile ratio by weight in the unreacted monomer in the system is kept at 7 or more, preferably in the range of 7 9.5.

The present invention further provides a thermoplastic resin composition containing the heat-resistant copolymer (I) and at least one of the following copolymers (II) and (III):

Copolymer (II): A copolymer comprising as the constituents 50-74% by weight of α-methylstyrene, 26-33% by weight of alkenyl cyanide and 0-24% by weight of other monomers copolymerizable with these monomers;

Copolymer (III): A rubber-modified thermoplastic resin obtained by graft-copolymerizing 30-80% by weight of a mixture of an aromatic alkenyl monomer, an alkenyl cyanide monomer and, if necessary, other alkenyl monomers copolymerizable with these monomers on 20-70% by weight of a rubber-like polymer.

Blending of said copolymer (II) and/or copolymer (III) with the heat-resistant copolymer (I) gives a composition with an excellent moldability, and especially, the blending of the copolymer (III) produces a composition with excellent impact resistance.

In the case of the production of the heat-resistant copolymer (I), αMS chains are formed depending on the reaction conditions in the copolymerization of α-methylstyrene as component (A) and acrylonitrile as component (B), the amount of the monomer copolymerized and the monomer reactivity, but usually each αMS chain contains three or less αMS units and the αMS-containing monomer chains include the following three different monomer chains:

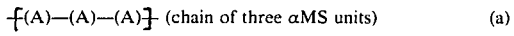 (chain of three αMS units)  (a)

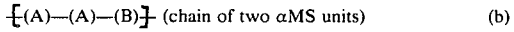 (chain of two αMS units)  (b)

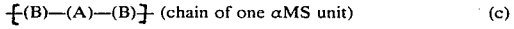 (chain of one αMS unit)  (c)

One of the important features of the present invention is that the content of the monomer chain (a) is adjusted to 15% by weight or less, preferably 13% by weight or less, more preferably 10% by weight or less, of the total amount (100% by weight) of (a), (b) and (c). If the content of the monomer chain (a) exceeds 15%, a violent decomposition takes place during the molding at a high temperature, and causes molding thermal instability in the course of molding to excessively lower the workability. Also, the monomers resulting from the decomposition remain in the molded article to reduce the heat resistance of the article.

On the other hand, in order to maintain the heat resistance of the resin, it is necessary to control the ratio of the monomer chain (b) (-[-(A)—(A)—(B)-]-) to 50% by weight or more, preferably 55-100% by weight, of the total weight of (a), (b) and (c), and to control the ratio of the monomer chain (c) (-[-(B)—(A)—(B)-]-) to 50% by weight or less, preferably in the range of 45-0% by weight, of the total weight of (a), (b) and (c).

The heat-resistant copolymer (I) of this invention can be obtained by copolymerizing 74-82 parts, preferably 76-80 parts, by weight of αMS and 18-26 parts, preferably 24-20 parts, by weight of AN. If the amount of αMS is less than 74 parts by weight, the proportion of the monomer chain (c) becomes too high to maintain the heat resistance, while if it exceeds 82 parts by weight, it follows that the monomer chain (a) is formed in excess and the heat stability is deteriorated.

In the present invention, in addition to αMS and AN, there may be used other copolymerizable monomers, for example, aromatic alkenyl compounds other than αMS such as styrene and the like, and acrylic or methacrylic esters such as methyl methacrylate (MMA) in an amount of not more than 10% by weight, as far as it impaires the object of this invention.

The process for producing the heat-resistant copolymer (I) of this invention comprises, for example, emulsion-copolymerizing αMS and AN by charging αMS and AN so that the αMS/AN ratio by weight becomes 9 or less, preferably 6.5-8.5 at the start of polymerization, adding a polymerization initiator to initiate the polymerization at 67°-90° C., preferably 70°-85° C., and supplying AN or both αMS and AN continuously or intermittently in the above temperature range over a long period of time while controlling the unreacted monomer concentration in the system so that the αMS/AN ratio by weight can be kept at 7 or more, preferably 7 to 12, more preferably 7 to 9.5 to complete the polymerization. The polymerization conversion is not critical, but it is preferably not less than 85% by weight.

If the αMS/AN ratio in the system is less than 7, the ratio of the monomer chain (C) -[-(B)—(A)—(B)-]- increases while the ratio of the monomer chain (b) -[-(A)—(A)—(B)-]- decreases, and hence, the desired effect on heat resistance cannot be obtained. On the other hand, the use of a too high αMS/AN ratio results in a too high ratio of the monomer chain (a) -[-(A)—(A)—(A)-]-, and makes it impossible to obtain the effect on thermal stability.

Also, if the polymerization temperature is less than 67° C., the ratio of the monomer chain (a) -[-(A)—(A)—(A)-]- becomes too large to achieve the desired effect on heat stability, while the use of polymerization temperature exeeding 90° C. results in an increase in the ratio of the monomer chain (c) -[-(B)—(A)—(B)-]- and a decrease in the stability of the latex produced.

Said emulsion polymerization can be accomplished by a conventional method under the usual conditions.

As the emulsifying agent used in said emulsion polymerization, there may be used anionic surfactants such as sodium and potassium salts of rosin acid and higher fatty acids, for example, lauric acid, oleic acid and the like; sodium and potassium salts of alkylbenzenesulfonic acids; sodium and potassium salts of sulfuric esters of higher alcohols; and polyethylene oxide alkyl ether sulfate; polyethylene oxide alkylphenyl ether sulfate; and the like alone or in admixture of two or more. It is also possible to use a nonionic surfactant alone or in admixture with the anionic surfactant. The polymerization catalyst is not critical, but in this invention, there may be used a persulfate and a redox catalyst comprising a combination of an organic peroxide such as cumene hydroperoxide, diisopropylbenzene hydroperoxide, paramenthane hydroperoxide, etc., with a reducing agent such as sugar-containing pyrophosphoric acid recipe, sulfoxylate recipe, or the like. Among them, a redox catalyst based on the sugar-containing pyrophosphate resipe is preferred as the use thereof enables the polymerization to be conducted in said temperature range. It is also possible to use a molecular weight regulator, a polymerization stabilizer and other additives which are generally used in emulsion polymerization.

The ratios of the αMS-containing monomer chains -[-(A)—(A)—(A)-]-, -[-(A)—(A)—(B)-]- and -[-(B)—(A)—(B)-]- are decided based on the peak of aromatic carbon 1 of αMS and its area ratio as mentioned below.

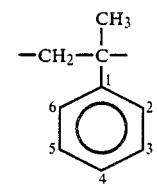

The distribution of each of the monomer chains (a), (b) and (c) is determined by dissolving a copolymer in deuterated chloroform, measuring $^{13}$C-NMR using tetramethylsilane as an internal standard, and taking, among the peaks appearing at 140-150 ppm, the peak in the range of 141-144 ppm as monomer chain (c) -[-(B)—(A)—(B)-]-, the peak in the range of 144.5-147 ppm as monomer chain (b) -[-(A)—(A)—(B)-]-, and the peak in the range of 147.5-150 ppm as monomer chain (a) -[-(A)—(A)—(A)-]-, and measuring the areas of these peaks.

The intrinsic viscosity [η] as measured in methyl ethyl ketone as 30° C. of the heat-resistant copolymer (I) of the present invention is preferably 0.2-0.7 dl/g, more preferably 0.25-0.5 dl/g.

Copolymer (II) is a copolymer consisting of 50–74% by weight, preferably 60–72% by weight, of α-methylstyrene (αMS), 26–33% by weight, preferably 28–31% by weight, of acrylonitrile (AN) and 0–24% by weight of a monomer copolymerizable with these monomers, in which preferably the proportion of the total of the monomer chains ─(αMS─αMS─αMS)─ and ─(αMS─αMS─AN)─ is 50% or less based on the total of said two monomer chains and another monomer chain ─(AN─αMS─AN)─. If the amount of αMS in the copolymer is less than 50% by weight, the heat resistance is not satisfactory and if it exceeds 74% by weight, the processability and impact resistance are not satisfactory. More preferably, the intrinsic viscosity [η] as measured in methyl ethyl ketone at 30° C. of the copolymer (II), which is a measure of the size of the molecule of the copolymer (II), is in the range of 0.3 to 0.8, preferably 0.35 to 0.7, dl/g. If the intrinsic viscosities of the heat-resistant copolymer (I) and the copolymer (II) are below their respective ranges defined above, the impact resistance of the resin produced becomes low, and if they exceed said ranges, the processability becomes inferior.

In order to obtain a thermoplastic resin composition excellent in all of heat resistance, impact resistance and moldability, it is preferable to mix the heat-resistant copolymer (I) with the copolymer (II) in a weight ratio of the heat-resistant copolymer (I) to the sum of the heat-resistant copolymer (I) plus the copolymer (II) of 0.4–0.8, preferably 0.5–0.75. If this ratio is larger than said range, that is, if the content of heat-resistant copolymer (I) becomes larger, the composition becomes inferior in impact resistance, and if the content of the heat-resistant copolymer (I) becomes smaller, sufficient heat resistance is not obtained. In both the heat-resistant copolymer (I) and the copolymer (II), α-methylstyrene and acrylonitrile may be copolymerized with other copolymerizable monomers which include styrene or styrene derivatives such as nuclear bromine-substituted styrene, nuclear chlorine-substituted styrene, nuclear methyl-substituted styrene, etc., and acrylic and metacrylic esters such as methyl acrylate, ethyl acrylate, methyl methacrylate, ethyl methacrylate, and the like.

In accordance with this invention, a thermoplastic resin composition having impact resistance is obtained by mixing the heat-resistant resin consisting of the heat-resistant copolymer (I) or a mixture of the heat-resistant copolymer (I) and the copolymer (II) with a rubber-modified thermoplastic resin [copolymer (III)] obtained by graft-copolymerizing an aromatic alkenyl compound, an alkenyl cyanide compound and, if necessary, other copolymerizable alkenyl monomers such as an acrylic or methacrylic ester on a rubber component.

The rubber component used in the preparation of the rubber-modified resin [copolymer (III)] includes polybutadiene, acrylonitrile-butadiene copolymer, styrene-butadiene copolymer, ethylene-porpylene copolymer rubber, ethylene-propylene-ethylidenenorborene copolymer rubber, acrylic rubber, natural rubber, polyisoprene, polychloroprene, and rubbers formed by coupling them with tin or lithium, and styrene-butadiene block copolymer. These rubbers may be used alone or in admixture of two or more.

Examples of the aromatic alkenyl compounds usable for said purpose are styrene, o-methylstyrene, m-methylstyrene, p-methylstyrene, chlorostyrene, dichlorostyrene, bromostyrene, dibromostyrene, α-methylstyrene, α-ethylstyrene, methyl-α-methylstryene, dimethylstyrene, vinylnaphthalene and the like. These compounds may be used alone or in admixture of two or more. Styrene, α-methylstyrene and p-methylstyrene are preferred.

Examples of the alkenyl cyanide compounds usuable for the preparation of the copolymer (III) are acrylonitrile and methacrylonitrile.

the (meth)acrylic ester includes, for example, methyl acrylate, ethyl acrylate, butyl acrylate, methyl methacrylate, ethyl methacrylate, β-hydroxyethyl acrylate, β-hydroxyethyl methacrylate and the like, among which methyl methacrylate is preferred.

In a preferred graft copolymer, the content of the rubber component is 20–70% by weight, the grafting degree (the ratio of the grafted monomers to the rubber component) is 25% or more in view of heat resistance, and the intrinsic viscosity [η] as measured in methyl ethyl ketone at 30° C. of ungrafted component (methyl ethyl ketone insolubles) is 0.2–1.0 dl/g in view of impact resistance and processability. The content of the rubber component is more preferably 30–70% by weight, most preferably 40–70% by weight; the grafting degree is more preferably 30% or more, most preferably 40% or more; and the intrinsic viscosity [η] of the ungrafted component is more preferably 0.25–0.8 dl/g.

The rubber-modified thermoplastic resin [copolymer (III)] can be produced most advantageously by emulsion polymerization. The polymerization catalyst used therefor is not critical, but the use of a redox catalyst is preferred. Dextrose, pyrophosphate and ferrous sulfate may preferably be used as the reducing agent of the redox catalyst, and the amounts of these reducing agents are preferably 0.3–0.9 part by weight in the case of dextrose, 0.2–0.6 part by weight in the case of pyrophosphate and 0.004–0.012 part by weight in the case of ferrous sulfate, per 100 parts by weight of the total of the diene rubber and the monomers.

The oxidizing agent in the redox catalyst is not critical, but, for instance, cumene hydroperoxide, diisopropylbenzene hydroperoxide, p-menthane hydroperoxide, t-butyl hydroperoxide and the like may preferably be used as the oxidizing agent.

The amount of the oxidizing agent used is 0.1 to 0.5 part by weight per 100 parts by weight of the total of the rubber charged and the monomers charged.

The emulsifying agent used for the graft-copolymerization is also not critical, but potassium and sodium salts of oleic acid, lauric acid, disproportionated rosin acid, dodecylbenzenesulfonic acid and the like may preferably be used as the emulsifying agent. The amount of the emulsifying agent used for said graft-copolymerization is 0.1–1.0 part by weight per 100 parts by weight of the total of the rubber charged and the monomers charged. The use of such an emulsifying agent in said amount in the graft-copolymerization can inhibit the formation of agglomerates and also helps to increase the impact strength of the resin produced.

These catalysts may be added at one time or portionwise. Also, they may be added continuously.

The above graft polymerization is effected by first adding a part of the monomer mixture to the whole amount of the diene rubber charged, initiating the polymerization with a redox catalyst, and continuously adding the rest of the monomer mixture over a long period of time while using a specified amount of a molecular weight regulator.

The monomeric components used for the graft-copolymerization may be added at one time to the diene rubber latex, but it is preferred to add a part or the whole of the monomer mixture continuously or portionwise over more than one hour. The diene rubber latex preferably has an average particle size in the range of 500–6,000 Å because the impact strength is improved.

The preferred mixing ratio of the heat-resistant resin composition consisting of the heat-resistant copolymer (I) and the copolymer (II) to the rubber-modified thermoplastic resin [copolymer (III)] is 50–80:50–20, more preferably 55–75:45–25, by weight. The proportion of the copolymer (III) is preferably not less than 20% by weight in respect of impact resistance; however, if it exceeds 50% by weight, the heat resistance and processability are deteriorated.

By blending the graft copolymer in the above-mentioned amount, the excellent heat resistance and heat stability of the heat-resistant resin composition of this invention can be more effectively imparted to the impact-resistant resin.

If the content of the rubber-like polymer in the copolymer (III) is less than 20%, the proportions of the heat-resistant copolymer (I) and the copolymer (II) become too small in connection with the fact that the preferred content of the rubber-like polymer in the thermoplastic resin composition obtained by mixing heat-resistant copolymer (I), the copolymer (II) and the copolymer (III) is 10 to 30% by weight, and it is difficult to obtain a resin composition having satisfactory heat and impact resistance. On the other hand, if the rubber-like polymer content exceeds 70%, the amount of the resin component grafted on the rubber-like polymer becomes too small to impart the satisfactory impact resistance to the composition.

The content of the rubber-like polymer component in the composition of the heat-resistant copolymer (I) and the copolymer (III) or the heat-resistant copolymer (I) and the copolymers (II) and (III) is preferably 10–30% by weight, more preferably 10–25% by weight. If this content is less than 10% by weight, the impact resistance is undesirably low, while if it exceeds 30% by weight, the rigidity of the product is lowered to invite a result of deterioration of heat resistance.

The heat-resistant copolymer (I) and the copolymer (II) used for obtaining the thermoplastic resin composition according to this invention can be produced by an appropriate polymerization such as emulsion polymerization, solution polymerization, suspension polymerization, or the like, but emulsion polymerization is preferred. Also, the mixing of the heat-resistant copolymer (I) with the copolymers (II) and (III) can be suitably accomplished in the form of emulsified latex, powder, pellets or combination thereof.

In the step of final mixing of the copolymers (I)–(III) or in the preceding step, it is desirable to remove the volatile matters such as the remaining monomers in the composition. If such volatile matters remain in the composition, the intended effect of the present invention regarding heat resistance, etc., may not be obtained.

In order to obtain a copolymer or a thermoplastic resin composition with excellent heat resistance, the contents of the volatile matters including the monomers remaining in each of the copolymers (I)–(III) and in the mixture thereof is preferably adjusted to less than 2,000 ppm, more preferably less than 1,500 ppm.

The following methods, for example, may be used for reducing the amount of the volatile matters remaining in the composition:

In one method, after the completion of polymerization, the remaining monomers are removed from the polymerization system by stripping or other procedures to reduce the unreacted monomer content to 2–5% by weight. The copolymer latex obtained is subjected to coagulation at a temperature of 110°–130° C. and water is evaporated to dry the copolymer to obtain powdery αMS—AN copolymer, and the remaining monomers are further removed from the powdery copolymer. According to this method, by, for instance, forming the composition into pellets while effecting degasification by means of a vented extruder, it is possible to reduce the amount of the remaining unreacted monomers to less than 2,000 ppm.

The mixing of the heat-resistant copolymer (I) [and the copolymer (II)] and the copolymer (III) may be made by mixing said αMS—AN copolymer pellets with the copolymer (III) and again subjecting them to an extruder, or said powdery αMS—AN copolymer, which has not yet been treated by an extruder, may be mixed with the copolymer (III) and the resulting mixture may be pelletized while conducting degasification by means of a vented extruder, whereby the remaining unreacted monomer content can be reduced to less than 2,000 ppm.

In case of using a vented extruder for removing the remaining volatile matters, it is preferred to use an extruder having 2 to 3 vent holes, especially a twin-screw extruder (both screws rotating in the same direction) as this extruder has a sufficient kneading effect and also high degasification performance. In some cases, water may be poured into the barrel of the vented extruder to increase the remaining monomer-removal efficiency (degasification efficiency).

By reducing the remaining monomer content in each of the copolymers (I)–(III) and that in the mixture thereof to 2,000 ppm or less it is possible to obtain a resin having excellent heat resistance.

On the contrary, if the resulting thermoplastic resin contains more than 2,000 ppm of unreacted monomer, this resin has inferior heat resistance and is also poor in moldability because much gas scatters in the molding.

To the thermoplastic resin composition of this invention may be added the ordinarily used additives such as lubricant, flame-retardant, anti-aging agent, ultraviolet absorbing agent and the like.

Also, the heat-resistant copolymer (I), the mixture of the heat-resistant copolymer (I) and the copolymer (II) or the thermoplastic resin obtained by mixing the mixture of the heat-resistant copolymer (I) and the copolymer (II) with the graft copolymer [copolymer (III)] may be further mixed with a heat-resistant thermoplastic resin such as, for example, polyphenylene oxide, polyethylene terephthalate, polybutylene terephthalate, polyacetal, polyamide, styrene-maleic anhydride copolymer, polycarbonate or the like.

The thus obtained heat-resistant resin composition is useful in the fields where heat resistance is required, such as interior parts of automobiles and parts of electrical appliances.

Hereinafter, the present invention will be explained in further detail referring to Examples and the accompanying drawing, which is a graph showing a relation between Vicat softening point and amount of remaining monomer in the resin obtained in Example 8. In the Examples and Comparative Examples, parts and percentages are by weight unless otherwise specified.

EXAMPLES 1-6

Into a nitrogen-purged reactor were charged 200 parts of ion exchanged water, 2.5 parts of potassium oleate, a mixture of α-methylstyrene and acrylonitrile indicated as monomer A in Table 1, and 0.4 part of t-dodecylmercaptan, and they were emuslified with stirring under a nitrogen atmosphere. After adjusting the temperature of the contents of the reactor to the temperature shown in Table 1, a solution of 0.25 part of sodium pyrophosphate, 0.35 part of dextrose and 0.005 part of ferrous sulfate in 20 parts of ion exchanged water was added, followed by further addition of 0.1 part of cumene hydroperoxide to initiate the polymerization. After continuing the polymerization for one hour, acrylonitrile or a mixture of acrylonitrile and α-methylstyrene indicated as monomer B in Table 1 as added continuously over a period of 4 hours. The reaction temperature in the polymerization was maintained at the value shown in Table 1. After the completion of the addition, the polymerization was continued for a further 2 hours. During the polymerization reaction, the reaction mixture was sampled at the given time intervals and the amounts of unreacted monomers were measured by gas chromatography to determine the αMS/An ratio in the system.

The resulting copolymer latex was coagulated with calcium chloride, and the copolymer was recovered, washed with water and dried. The thus obtained powder was further dried in vacuo at 120° C. for 5 hours and the pelletized. Test pieces were peferred from the pellets by an injection machine set at a cylinder temperature of 230° C., and the Vicat softening point of each test piece was measured. In the next test, the cylinder temperature of the injection machine was set at 280° C. and the pellets were left in the cylinder for 15 minutes and then subjected to injection molding. Test pieces were prepared in the same way as described above and their Vicat softening point was determined. Also, these test pieces and the pellets before molding were separately dissolved in N,N-dimethylformamide and the change in amount of the remaining monomer before and after molding was examined by gas chromatography.

Said powder before pelletization was re-dissolved in tetrahydrofuran and reprecipitated in isopropanol, and the thus purified powder was subjected to $^{13}$C-NMR measurement. That is, the purified powder was dissolved in deuterated hydrogenated chloroform and to the solution added tetramethylsilane as an internal standard, after which the solution was measured by $^{13}$C-NMR of 25 MHz. Of the peak appearing at 140-150 ppm, the peak appearing in the range of 141-144 ppm was assigned to the monomer chain (c) $-\!\!\left[(B)\!-\!(A)\!-\!(B)\right]\!\!-$, the peak appearing in the range of 144.5-147 ppm to the monomer chain (b) $-\!\!\left[(A)\!-\!(A)\!-\!(B)\right]\!\!-$, and the peak appearing in the range of 147.5-150 ppm to the monomer chain (a) $-\!\!\left[(A)\!-\!(A)\!-\!(A)\right]\!\!-$, and the distribution of each of the monomer chains was determined from the area ratio of each peak. The results are shown in Table 1.

COMPARATIVE EXAMPLES 1-3

Table 2 shows examples of copolymers which are outiside the scope of the present invention.

In Comparative Example 1, 0.2 part of sodium formaldehydesulfoxylate, 0.1 part of sodium ethylenediaminetetraacetate and 0.005 part of ferrous sulfate were used in place of the sodium pyrophosphate, dextrose and ferrous sulfate in Example 1, and after the addition of monomer B, the polymerization was continued for 16 hours. In this case, because the polymerization was conducted at a low temperature, the monomer chain $-\!\!\left[(A)\!-\!(A)\!-\!(A)\right]\!\!-$ was formed in a large amount which exceeds the range specified in the present invention. Although the copolymer shows a high Vicat softening point, the test piece molded after 15-minute residence in the extruder barrel at 280° C. was greatly reduced in Vicat softening point and further the amount of the remaining monomer before molding was large. This dictates that the formation of a large amount of the monomer chain $-\!\!\left[(A)\!-\!(A)\!-\!(A)\right]\!\!-$ results in a drop of heat stability of the copolymer. Comparative Example 2 is the case where α-methylstyrene in the monomers employed in Example 1 was used in a greater amount than specified in the present invention. In this case, too, many monomer chains $-\!\!\left[(A)\!-\!(A)\!-\!(A)\right]\!\!-$ were formed and the effect of the present invention could not be achieved.

EXAMPLE 7 AND COMPARATIVE EXAMPLE 4

Preparation of rubber-modified thermoplastic resin

Into a nitrogen-purged reactor equipped with a stirrer were charged 80 parts of ion-exchanged water, 60 parts of polybutadiene latex (as solids) and ⅓ of an emulsion (a) formed by emulsifying 60 parts of ion exchanged water, 28 parts of styrene, 12 parts of acrylonitrile, 1 part of potassium oleate and 0.2 part of t-dodecylmercaptan, and they were emulsified. After raising the temperature to 40° C. with stirring under a nitrogen atmosphere a solution of 0.2 part of sodium pyrophosphate, 0.4 part of dextrose and 0.01 part of ferrous sulfate in 20 parts of ion exchanged water and 0.1 part of cumene hydroperoxide were added to the emulsion, and the resulting mixture was subjected to reaction for one hour while maintaining the jacket at 70° C. Then the remainder of the emulsion (a) and 0.1 part of cumene hydroperoxide were added continuously to the polymerization system over a period of 3 hours, followed by further addition thereto of a solution of 0.05 part of sodium pyrophosphate, 0.1 part of dextrose and 0.0025 part of ferrous sulfate in 5 parts of ion exchanged water and 0.025 part of cumene hydroperoxide, and the resulting mixture was stirred for an additional one hour to complete the polymerization.

The thus obtained rubber-modified thermoplastic resin and the copolymer obtained in Example 1 were mixed in the latex state so that their solids-weight ratio became 67:33 (diene rubber-like polymer in the mixture composition being about 20%), and an antioxidant was added to the mixture and coagulated with calcium chloride. The coagulate was filtered, washed, dried, further dried in vacuo at 120° C. for 5 hours and then pelletized. From the thus obtained pellets were prepared test pieces by an injection machine set at a cylinder temperature of 230° C., and their physical properties were determined. The results are shown in Table 3. The grafting degree $$\left(\frac{\text{resin component grafted on rubber component}}{\text{rubber component}} \times 100\right)$$

was 48%, and the intrinsic viscosity [η] of the ungrafted component was 0.35 dl/g.

Apart from the above, a molding thermal stability test was conducted by the method described below and the result showed excellent molding thermal stability of the resin.

For comparison, the physical properties of a resin obtained by mixing said rubber-modified thermoplastic resin and the copolymer latex obtained in Comparative Example 1 in a mixing ratio of 67:33 were also shown in Table 3. This comparative resin showed higher heat resistance than Example 7 but was inferior in molding thermal stability. This is considered attributable to the occurrence of thermal decomposition during molding because of a greater amount of the monomer chain ${(A)-(A)-(A)}$ than the range specified in the present invention. This affects adversely the processability.

Molding thermal stability test:

By using a mold for evaluation of molding thermal stability, the pelletized material was injection molded by setting the cylinder temperature at 260° C. while changing the injection speed, and the state of molding thermal stability was examined.

TABLE 1

| | | Example | | | | | |
|---|---|---|---|---|---|---|---|
| | | 1 | 2 | 3 | 4 | 5 | 6 |
| Monomer A (part) | α-Methylstyrene | 70 | 80 | 50 | 60 | 27 | 35 |
| | Acrylonitrile | 9 | 10 | 6 | 8 | 3.5 | 5 |
| Monomer B (part) | α-Methylstyrene | 5 | 0 | 30 | 20 | 52 | 45 |
| | Acrylonitrile | 16 | 10 | 14 | 12 | 17.5 | 15 |
| Polymerization temperature (°C.) | | 75 | 70 | 75 | 80 | 75 | 75 |
| αMS/AN in the system (weight ratio) | 1.5 hr. after start of polymerization | 9.2 | 9.3 | 9.4 | 9.4 | 9.2 | 8.9 |
| | 3 hr. after start of polymerization | 8.9 | 9.2 | 8.3 | 8.8 | 8.7 | 8.6 |
| | 4.5 hr. after start of polymerization | 8.1 | 8.2 | 8.2 | 7.6 | 7.8 | 7.9 |
| Chain distribution in copolymer (%)*1 | (a) ${(A)-(A)-(A)}$ | 6.8 | 7.2 | 6.0 | 5.7 | 4.5 | 3.5 |
| | (b) ${(A)-(A)-(B)}$ | 63.4 | 65.2 | 67.3 | 61.0 | 60.0 | 62.3 |
| | (c) ${(B)-(A)-(B)}$ | 29.8 | 27.6 | 26.7 | 33.3 | 35.5 | 34.2 |
| Intrinsic viscosity (dl/g) | $[\eta]$ (MEK*3 30° C.) | 0.35 | 0.38 | 0.41 | 0.37 | 0.42 | 0.37 |
| Vicat softening point (°C.)*2 | Molded at 230° C. | 141 | 143 | 141 | 140 | 140 | 141 |
| | Molded after 15-minutes residence at 280° C. | 139 | 140 | 140 | 138 | 138 | 139 |
| Amount of remaining monomer ppm | Before molding | 1100 | 1200 | 750 | 900 | 850 | 950 |
| | Molded after 15 minutes residence at 280° C. | 3200 | 4500 | 1800 | 3100 | 2900 | 3200 |

Note:
*1Weight ratio to the total of (a) + (b) + (c).
*2Measured according to ASTM D-1525. (This applies hereinafter.)
*3MEK = methyl ethyl ketone.

TABLE 2

| | | Comparative Example | | |
|---|---|---|---|---|
| | | 1 | 2 | 3 |
| Monomer A (part) | α-Methylstyrene | 80 | 88 | 35 |
| | Acrylonitrile | 5 | 4 | 15 |
| Monomer B (part) | α-Methylstyrene | 0 | 0 | 35 |
| | Acrylonitrile | 15 | 8 | 15 |
| Polymerization temperature (°C.) | | 40 | 75 | 75 |
| αMS/AN in the system (weight ratio) | 1.5 hr. after start of polymerization | 8.1 | 19.5 | 2.5 |
| | 3 hr. after start of polymerization | 7.3 | 15.3 | 2.4 |
| | 4.5 hr. after start of polymerization | 6.4 | 12.4 | 2.3 |
| Chain distribution in copolymer (%) | (a) ${(A)-(A)-(A)}$ | 17.2 | 16.4 | 1.2 |
| | (b) ${(A)-(A)-(B)}$ | 58.0 | 59.2 | 36.9 |
| | (c) ${(B)-(A)-(B)}$ | 24.8 | 24.4 | 61.9 |
| Intrinsic viscosity (dl/g) | $[\eta]$ (MEK 30° C.) | 0.34 | 0.29 | 0.51 |
| Vicat softening temperature (°C.) | Molded at 230° C. | 146 | 10 146 | 146 |
| | Molded after 15-minutes resistance at 280° C. | 132 | 133 | 125 |
| Amount of remaining monomer (ppm) | Before molding | 1050 | 1200 | 1150 |
| | Molded after 15-minutes resistance at 280° C. | 16200 | 15700 | 2500 |

TABLE 3

| | Example 7 | Comparative Example 4 |
|---|---|---|
| Vicat softening point (°C.) & amount of remaining monomer (ppm) (molded at 230° C./molded after 15-minutes residence at 280° C.) | 140.5/139 1200/2700 | 144.5/130.5 1350/16750 |
| Izod impact strength*1 (kg · cm/cm) | 13.9 | 13.4 |
| Molding thermal stability | Excellent | Poor |

Note:
*1Measured according to ASTM D-256 (notched). Molded at 230° C.

EXAMPLE 8

180 parts of ion exchanged water, 2 parts of potassium stearate, 75 parts of α-methylstyrene, 7 parts of acrylonitrile and 0.2 part of tertiary dodecylmercaptan were fed to a nitrogen-purged reactor equipped with a stirrer. After raising the temperature to 60° C. while stirring the mixture in a nitrogen stream, a solution of 0.2 part of sodium pyrophosphate, 0.4 part of glucose and 0.01 part of ferrous sulfate in 16 parts of ion exchanged water and 0.1 part of cumene hydroperoxide were added thereto to initiate the polymerization reaction. After continuing the polymerization for one hour by controlling the jacket temperature of the reactor at 70° C., an emulsion formed by emulsifying 18 parts of acrylonitrile in 50 parts of ion exchanged water and 0.5 part of potassium stearate was added continuously over a period of 7 hours, and thereafter, the polymerization was further continued for one hour. The overall monomer conversion to polymer was 88%. The obtained latex was placed in a vessel heated to 80° C. and the vessel was evacuated, after which the latex was subjected to monomer removal operation under stirring for 3 hours to form a latex having an unreacted monomer content of 4.5%. This latex was added to a calcium chloride solution maintained at 120° C. with stirring, and the mixed solution was coagulated and the polymer was recovered. The thus obtained hydrous powder was dried by a fluid dryer (at 85° C. for one hour) to obtain a resin powder. The particle size distribution of this powder was such that 2% of the powder passed a 200-mesh (74η) screen. The amount of unreacted monomer contained in the powder was 1.8%. The amount of acrylonitrile in the powder as determined by the Coleman nitrogen analysis was 22%. The obtained powder was pelletized while conducting degasification and monomer removal by using a vented extruder (Toshiba Kikai TEM 50A, three-stage vents). The amount of the monomers remaining in the pellets was 1,300 ppm, and the Vicat softening point of the pellets (measured according to ASTM D-1525) was 144° C. Pellets were also formed by changing the monomer removing efficiency of the vented extruder and their Vicat softening point was measured, the results being shown in FIG. 1. As seen from FIG. 1, a thermoplastic resin with excellent heat resistance can be obtained by reducing the amount of the remaining monomers to less than 2,000 ppm.

EXAMPLES 9 AND 10

Following the process of Example 8, emulsion copolymerization of α-methylstyrene and acrylonitrile was conducted to obtain compositions having different α-methylstyrene contents. Pellets were formed from these compositions using the same after-treatment process as in Example 8 and the Vicat softening point of the pellets was measured. The results are shown in Table 4.

TABLE 4

|  | Example | | |
|---|---|---|---|
|  | 8 | 9 | 10 |
| Remaining monomer after polymerization (%) | 12 | 8 | 20 |
| Remaining monomer after monomer removing operation (%) | 4.5 | 3.0 | 5.0 |
| Remaining monomer in powder (%) | 1.8 | 1.3 | 1.9 |
| Remaining monomer in pellets (ppm) | 1,300 | 1,000 | 1,800 |
| α-methylstyrene/acrylonitrile ratio by weight | 78/22 | 75/25 | 81/19 |
| Vicat softening point of pellet moldings (°C.) | 144 | 141 | 146 |
| Chain distribution in copolymer |  |  |  |
| ⁅(A)—(A)—(A)⁆ | 6.3 | 4.3 | 9.7 |
| ⁅(A)—(A)—(B)⁆ | 63.4 | 60.2 | 62.3 |
| ⁅(B)—(A)—(B)⁆ | 29.8 | 35.5 | 23.2 |

Note:
*Measured by alcohol coagulation.

If the α-methylstyrene content in the composition of α-methylstyrene and acrylonitrile was less than 75% by weight, such composition was low in heat-resistance, and when it is tried to obtain a composition with greater than 82% by weight of α-methylstyrene, the remaining monomer content after the polymerization was high and the conversion to the polymer was too low to be practical.

EXAMPLES 11-14

Rubber-modified thermoplastic resins produced in the same manner as in Example 7 according to the formulation shown in Table 5, were mixed with the pellets obtained in Example 8, and the mixtures were pelletized by an extruder to obtain various types of pellets. The properties of the various types of mixed thermoplastic resins are shown in Table 5.

TABLE 5

|  | Example | | | |
|---|---|---|---|---|
|  | 11 | 12 | 13 | 14 |
| Mixed resin composition |  |  |  |  |
| Rubber-modified thermoplastic resin |  |  |  |  |
| Type of rubber | PBD*[3] | PBD*[3] | EPDM*[4] | EPDM*[4] |
| Amount of rubber (part) | 60 | 40 | 50 | 30 |
| Amount of styrene (part) | 28.8 | 43.2 | 36 | 49 |
| Amount of acrylonitrile (part) | 11.2 | 16.8 | 14 | 21.6 |
| Amount of resin mixed (part) | 33 | 40 | 30 | 35 |
| Mixed amount of α-methylstyrene and acrylonitrile copolymer of Example 8 (part) | 67 | 60 | 70 | 65 |
| Amount of remaining monomer in pellets (ppm) | 1,200 | 1,000 | 800 | 1,400 |
| Properties of mixed resin |  |  |  |  |
| Vicat softening point (°C.) | 141 | 140 | 142 | 140 |
| Izod impact strength*[1] (kg·cm/cm) | 18 | 12 | 14 | 8 |
| Koka type flow values*[2] ($\times 10^{-3}$ ml/sec) | 10 | 12 | 9 | 14 |

Note:
*[1]ASTM D 256 (¼" width, notched)
*[2]The volume of resin discharged from a nozzle having a diameter of 1 mm and a length of 2 mm for one second when a load of 30 kg/cm² was applied at 230° C. was measured by using Koka Type Flow Tester.
*[3]PBD = polybutadiene
*[4]EPDM = ethylene-propylene-5-ethylidene-2-norbornene copolymer rubber

EXAMPLES 15–∫ & Comparative Example 5

Heat-resistant copolymer (I)

The heat-resistant copolymers produced in the same manner as in Example 2 are shown in Table 7.

Preparation of copolymer (II)

Into a nitrogen-purged reactor were charged 200 parts of ion exchanged water, 2.5 parts of potassium oleate, 70 parts of α-methylstyrene, 30 parts of acrylonitrile and 0.4 part of tertiary dodecylmercaptan, and emulsified with stirring in a nitrogen stream. After raising the internal temperature of the reactor to 40° C., a solution of 0.25 part of sodium pyrophosphate, 0.35 part of dextrose and 0.005 part of ferrous sulfate in 20 parts of ion exchanged water was added thereto, followed by further addition of 0.2 part of cumene hydroperoxide to initiate the polymerization. The polymerization was continued for 3 hours while maintaining the polymerizer jacket temperature at 60° C. In the same manner as in the case of A-1 of the above copolymer (I), a copolymer B-1 was recovered in the form of powder. The acrylonitrile content of this copolymer was 29%. Also, the content of monomer chains ⁅-αMS—αMS—αMS⁆, ⁅αMS—αMS—AN⁆ and ⁅AN—αMS—AN⁆ were 1%, 15% and 84%, respectively. The intrinsic viscosity [η] as measured in methyl ethyl ketone at 30° C. was 0.48 dl/g.

There were likewise produced copolymers B-2, B-3 and B-4 as shown in Table 3. The results are shown in Table 8.

Preparation of rubber-modified thermoplastic resin (III)

The graft copolymer of Example 7 was used.

Then, the thermoplastic copolymer powder A-1, the thermoplastic copolymer powder B-1 and the rubber-modified thermoplastic resin powder C-1 were mixed in the proportions shown in Table 6 and the mixture was melt-extruded while effecting degasification by means of a vented 50 m/m$\phi$ extruder (cylinder temperature set at 260° C.) to obtain pellets. These pellets were dried at 80° C. for more than 2 hours and formed into test pieces using an injection machine (Toshiba Machinery IS 70A) at a cylinder temperature of 240° C., and their properties were determined. The results are shown in Table 6. The testing method and conditions were as follows:

Falling weight impact strength (breaking energy at the time of fall)

| | |
|---|---|
| Falling weight load: | 10 kg |
| Falling distance: | 0.5 m |
| Radius of curvature of falling rod end: | 12.7 mm |
| Diameter of test piece receiving pan: | 45 mm |
| Test piece thickness: | 2.4 mm |

Flow property (bar flow)

| | |
|---|---|
| Molding machine: | Toshiba Machinery IS-50A |
| Injection pressure: | 840 kg/cm$^2$ |
| Mold: | 20 × 2 mm (width × thickness) |
| Mold temperature: | 50° C. |

Heat resistance
(1) Heat deformation temperature ASTM D-648
   Test piece: $\frac{1}{2}'' \times \frac{1}{2}'' \times 5''$
   Condition: loading of 264 psi.
(2) Heat shrinkage
   Test piece: $\frac{1}{8}'' \times \frac{1}{2}'' \times 5''$
   Condition: Allowed to stand in a 120° C. Geer oven for 2 hours.
   Measurement: Shrinkage in the 5-inch direction.

TABLE 6

| | Example | | | Comparative Example |
|---|---|---|---|---|
| | 15 | 16 | 17 | 6 |
| Copolymer A - 1 (part) | 47 | 35 | 27 | — |
| Copolymer B - 1 (part) | 20 | 32 | 40 | 67 |
| [A/(A + B)] | [0.7] | [0.52] | [0.4] | |
| Rubber-modified thermoplastic resin C - 1 (part) | 33 | 33 | 33 | 33 |
| Remaining monomer (ppm) | 1150 | 1400 | 950 | 1200 |
| Impact strength | | | | |
| (1) Izod impact strength (kg-cm/cm) | 20 | 23 | 24 | 32 |
| (2) Falling weight impact strength (kg-m) | 200 | 230 | 240 | 270 |
| Flow property (cm) | 19 | 18 | 17 | 13 |
| Heat resistance | | | | |
| (1) Heat deformation temperature (°C.) | 110 | 108 | 108 | 104 |
| (2) Heat shrinkage | 0.8 | 1.3 | 1.8 | 8.2 |

TABLE 7

| | A - 1 | A - 2 | A - 3 | A - 4 |
|---|---|---|---|---|
| Monomer composition (%) | | | | |
| α-Methylstyrene | 79 | 81 | 76 | 78 |
| Acrylonitrile | 21 | 19 | 24 | 20 |
| Methyl methacrylate | 0 | 0 | 0 | 2 |
| [η] dl/g | 0.35 | 0.38 | 0.38 | 0.36 |
| Chain distribution in copolymer (%) | | | | |
| ⁅(A)—(A)—(A)⁆ | 8.6 | 9.8 | 6.5 | — |
| ⁅(A)—(A)—(B)⁆ | 66.4 | 67.0 | 62.5 | — |
| ⁅(B)—(A)—(B)⁆ | 25.0 | 23.2 | 31.0 | — |

TABLE 8

| | B - 1 | B - 2 | B - 3 |
|---|---|---|---|
| Monomer composition (%) | | | |
| α-Methylstyrene | 71 | 73 | 52 |
| Acrylonitrile | 29 | 27 | 28 |
| Styrene | 0 | 0 | 20 |
| [η] dl/g | 0.48 | 0.52 | 0.50 |
| Chain distribution in copolymer (%) | | | |
| ⁅(A)—(A)—(A)⁆ | 1.0 | 2.1 | — |
| ⁅(A)—(A)—(B)⁆ | 15.0 | 34.1 | — |
| ⁅(B)—(A)—(B)⁆ | 84.0 | 63.8 | — |

EXAMPLES 18–22 AND COMPARATIVE EXAMPLE 7

The compositions prepared using the copolymers (I) and (II) shown in Table 7 and Table 8 are shown in Table 9.

TABLE 9

| | Example | | | | | Comparative Example |
|---|---|---|---|---|---|---|
| | 18 | 19 | 20 | 21 | 22 | 7 |
| Copolymer A - 1 (part) | 47 | 47 | | | | |
| Copolymer A - 2 (part) | | | 47 | | | |
| Copolymer A - 3 (part) | | | | 47 | | |
| Copolymer A - 4 (part) | | | | | 47 | |
| Copolymer B - 1 (part) | | | 20 | | 20 | |
| Copolymer B - 2 (part) | 20 | | | | | 47 |
| Copolymer B - 3 (part) | | 20 | | 20 | | 20 |
| A/(A + B) (by weight) | 0.7 | 0.7 | 0.7 | 0.7 | 0.7 | 0 |
| Rubber-modified thermoplastic resin C - 1 (part) | 33 | 33 | 33 | 33 | 33 | 33 |
| Remaining monomer (ppm) | 1350 | 1050 | 950 | 1200 | 1300 | 1400 |
| Impact strength | | | | | | |
| (1) Izod impact strength (kg-cm/cm) | 16 | 23 | 15 | 24 | 18 | 23 |
| (2) Falling-weight impact strength (kg-m) | 160 | 230 | 140 | 280 | 170 | 280 |
| Flow property (cm) | 17 | 19 | 16 | 20 | 19 | 23 |
| Heat resistance | | | | | | |
| (1) Heat deformation temperature (°C.) | 109 | 106 | 110 | 104 | 108 | 101 |
| (2) Heat shrinkage (%) | 0.6 | 0.9 | 0.3 | 2.0 | 0.7 | 7.4 |

EXAMPLES 23–29

Preparation of rubber-modified thermoplastic resins (A), (B), (C), (D), (E) and (F)

A mixed solution of 250 parts of water and 0.5 part of potassium oleate was charged into a reactor, and to this mixture with stirring by a stirrer were added a polybutadiene latex (average particle size 2,500 Å, measured by Nano-sizer, manufactured by Nikkaki K.K.) and the mixture (A) shown in Table 10. After removing oxygen, the mixture was heated to 50° C. in a nitrogen stream, followed by simultaneous feed of the mixture (B) of Table 10 and 0.1 part of cumene hydroperoxide, allowing the mixture to react for one hour. Then, the mixture (C) of Table 10 was added continuously over a period of 3 hours for a further reaction.

Thereafter, one sixth of the mixture (B) of Table 10 and 0.05 part of cumene hydroperoxide were added and the whole mixture was allowed to stand for one hour. An antioxidant was added to the resulting latex, then solidified, washed with water, dehydrated and dried to obtain a powder.

Preparation of copolymers (a) and (b)

250 parts of water, 3 parts of potassium oleate, 0.5 part of t-dodecylmercaptan, 70 parts of α-methylstryene (80 parts in the case of (b)) and 10 parts of acrylonitrile (5 parts in the case of (b)) were charged into a reactor equipped with a stirrer. After removing oxygen, the mixture was heated to 50° C. in a nitrogen stream, thereto were added 2 parts of tetrasodium ethylenediaminetetraacetate, 0.4 part of sodium formaldehydesulfoxylate, 0.003 part of ferrous sulfate and 0.1 part of diisopropylbenzenehydroperoxide, allowing the mixture to react for one hour. Then a mixture of 20 parts of acrylonitrile (15 parts in the case of (b)) and 0.1 part diisopropylbenzene hydroperoxide was added continuously over a period of 8 hours.

The resulting latex was solidified, dried, washed with water, dehydrated and then further dried to obtain a powder (copolymer (a)).

The thus obtained rubber-modified thermoplastic resin and copolymer were mixed in the ratios shown in Table 10, and each mixture was kneaded and formed into pellets by an extruder. These pellets were molded into test pieces by using an injection machine and their properties were determined. The results are shown in Table 10.

The chain distribution (weight %) of each of said copolymers (a) and (b) was as follows:

| Chain distribution of copolymer | (a) | (b) |
|---|---|---|
| ─{(A)—(A)—(A)}─ | 2.5 | 6.3 |
| ─{(A)—(A)—(B)}─ | 31.3 | 64.3 |
| ─{(B)—(A)—(B)}─ | 66.2 | 29.4 |

TABLE 10

| | Example | | | | | | |
|---|---|---|---|---|---|---|---|
| | 23 | 24 | 25 | 26 | 27 | 28 | 29 |
| (Formulation of graft copolymer) | (A) | | (B) | (C) | (D) | (E) | (F) |
| Polybutadiene latex (part) | 60 | 55 | 60 | 60 | 70 | | 60 |
| Mixture (A) | | | | | | | |
| α-Methylstyrene (part) | 10 | 15 | 6 | 10 | 7.5 | | 10 |
| Styrene (part) | 4 | 2.5 | 8 | 4 | 3 | | 4 |
| Acrylonitrile (part) | 6 | 5 | 6 | 6 | 4.5 | | 6 |
| t-Dodecylmercaptan (part) | 0.1 | 0.15 | 0.15 | 0.1 | 0.75 | | 0.1 |
| Mixture (B) | | | | | | | |
| Sodium pyrophosphate (part) | 0.4 | 0.4 | 0.4 | 0.5 | 0.2 | Tetrasodium ethylenediaminetetraacetate | 2 |
| Dextrose (part) | 0.6 | 0.6 | 0.6 | 0.7 | 0.3 | Sodium formaldehyde-sulfoxylate | 0.4 |
| Ferrous sulfate (part) | 0.008 | 0.008 | 0.08 | 0.01 | 0.004 | Ferrous sulfate | 0.004 |
| Water (part) | 10 | 10 | 10 | 10 | 10 | | 10 |
| Mixture (C) | | | | | | | |
| α-Methylstyrene (part) | 10 | 15 | 6 | 10 | 7.5 | | 10 |
| Styrene (part) | 4 | 2.5 | 8 | 4 | 3 | | 4 |
| Acrylonitrile (part) | 6 | 5 | 6 | 6 | 4.5 | | 6 |
| Cumene hydroperoxide (part) | 0.1 | 0.15 | 0.1 | 0.07 | 0.075 | | 2 |
| Polymerization conversion (%) | 96 | 95 | 97 | 95 | 96 | | 96 |
| Grafting degree (%) | 50 | 55 | 52 | 55 | 38 | | 50 |
| [η] (dl/g) | 0.29 | 0.33 | 0.30 | 0.35 | 0.24 | | 0.28 |
| (Monomer component of heat-resistant resin) | (a) | (a) | (a) | (a) | (b) | | (a) |
| α-methylstyrene/acrylonitrile | 70/30 | | 70/30 | 70/30 | 70/30 | 80/20 | 70/30 |
| Remaining monomer (ppm) | 1550 | 1750 | 950 | 1150 | 800 | 1000 | 1250 |
| Graft copolymer/heat-resistant resin (part) | (A)/(a) 30/70 | (A)/(a) 40/60 | (B)/(a) 45/55 | (C)/(a) 30/70 | (D)/(a) 30/70 | (E)/(b) 30/70 | (F)/(a) 30/70 |
| Heat deformation temperature (ASTM D 648) | 112 | 110 | 109 | 110 | 112 | 114 | 111 |
| Izod impact strength with notch (kg · cm/cm) (ASTM D 256) | 17 | 20 | 22 | 16 | 18 | 16 | 13 |
| Processability ($10^{-3}$ cc/sec) (Koka Type Flow Tester 1 mmφ × 2 mm, 30 kg/cm², 230° C.) | 9.5 | 8.5 | 8.0 | 9.3 | 9.0 | 8.7 | 7.8 |

What is claimed is:

1. A thermoplastic resin composition comprising a heat-resistant copolymer (I), a rubber-modified thermoplastic resin (III) obtained by graft-copolymerizing 30–80% by weight of an alkenyl monomer mixture comprising an aromatic alkenyl monomer and an alkenyl cyanide monomer on 20–70% by weight of a synthetic ene or diene rubber, the said heat-resistant copolymer (I) containing 74–82% by weight of (A) α-methylstyrene and 18–26% by weight of (B) acrylonitrile and also containing (a) 0–10% by weight of the monomer chain: ─{(A)—(A)—(A)}─, (b) at least 50% by weight of the monomer chain: ─{(A)—(A)—(B)}─, and (c) no more than 50% by weight of the monomer chain: ─{(B)—(A)—(B)}─, wherein the total amount of chains (a), (b) and (c) is 100% by weight, said heat-resistant copolymer (I) being prepared by a process, comprising:

feeding (A) 25–82% by weight of a α-methylstyrene and (B) 3–12% by weight of acrylonitrile in a (A) to (B) weight ratio of less than 9 into a reactor; emulsifying the charged monomers;

initiating the polymerization of the monomers at a temperature of 67°-90° C.;

continuing the polymerization reaction at said temperature and simultaneously, continuously or intermittently feeding acrylonitrile or a mixture of α-methylstyrene and acrylonitrile into the polymerization medium after the polymerization reaction has progressed for at least one hour so that the weight ratio of α-methylstyrene to acrylonitrile in the unreacted monomers within the system is maintained at at least 7, while continuing the polymerization at the said temperature until the amounts of acrylonitrile and alpha-methylstyrene reach their predetermined levels within the above stated ranges.

2. The thermoplastic resin composition according to claim 1, wherein the ratio of ‑[(A)—(A)—(A)‑]/‑[(A)—(A)—(B)‑]/‑[(B)—(A)—(B)‑] in the heat-resistant copolymer (I) is 1-10/55-100/0-40 by weight.

3. The thermoplastic resin composition according to claim 1, wherein the weight ratio of α-methylstyrene/acrylonitrile in the heat-resistant copolymer (I) is 76-82/24-18.

4. The thermoplastic resin composition according to claim 1, wherein, in addition to α-methylstyrene and acrylonitrile, other copolymerizable monomers are copolymerized in an amount of not more than 10% by weight in the production of the copolymer (I).

5. The thermoplastic resin composition according to claim 1, wherein the heat-resistant copolymer (I) has an intrinsic viscosity [η] as measured in methyl ethyl ketone at 30° C. of 0.2 to 0.7 dl/g.

6. The thermoplastic resin composition according to claim 1, wherein the heat-resistant copolymer (I) has an intrinsic viscosity [η] as measured in methyl ethyl ketone at 30° C. of 0.25 to 0.5 dl/g.

7. The thermoplastic resin composition according to claim 1, wherein the remaining monomer content in the copolymer (I) is 2,000 ppm or less.

8. The thermoplastic resin composition according to claim 1, wherein the remaining monomer content in the copolymer (I) is 1,500 ppm or less.

9. The thermoplastic resin composition according to claim 1, which comprises 80-50% by weight of the heat resistant copolymer (I) and 20-50% by weight of the rubber-modified thermoplastic resin (III) obtained by graft polymerizing 80-30 parts by weight of an alkenyl monomer mixture comprising 20-80% by weight of an aromatic alkenyl monomer and 80-20% by weight of an alkenyl cyanide, in the presence of 20-70 parts by weight of a synthetic ene or diene rubber, in which the grafting degree is 20% or more and the intrinsic viscosity [η] of the ungrafted component, as measured in methyl ethyl ketone at 30° C., is 0.2 -1.0 dl/g.

10. The thermoplastic resin composition according to claim 1 or 9, wherein the rubber-modified thermoplastic resin (III) is produced by emulsion polymerization using a redox catalyst as the polymerization catalyst while using as reducing agent thereof a mixture of dextrose, pyrophosphate and ferrous sulfate, and the polymerization is carried out while adding a part or all of the monomer mixture continuously or portionwise.

11. The thermoplastic resin composition according to claim 10, wherein 0.3-0.9 part by weight of dextrose, 0.2-0.6 part by weight of pyrophosphate and 0.004-0.012 part by weight of ferrous sulfate are used as the reducing agent of the redox catalyst per 100 parts by weight in total of the rubber and the alkenyl monomer.

12. The thermoplastic resin composition according to claim 1, wherein the aromatic alkenyl monomer is styrene, α-methylstyrene, or a mixture thereof.

13. The thermoplastic resin composition according to claim 1 or 9, wherein the alkenyl monomer mixture is a mixture consisting of at least one member selected from styrene and α-methylstyrene, and an alkenyl cyanide compound.

14. The thermoplastic resin composition according to claim 1 or 9, wherein the rubber-modified thermoplastic resin is obtained by graft-polymerizing 50-30 parts by weight of an alkenyl monomer mixture containing 20-60% by weight of an aromatic alkenyl monomer on 50-70 parts by weight of said rubber.

15. The thermoplastic resin composition according to claim 1 or 9, wherein the rubber-modified thermoplastic resin has a rubber content of 30-70% by weight, a grafting degree of 30% or more and an intrinsic viscosity [η] of the ungrafted component, as measured in methyl ethyl ketone at 30° C., of 0.25-0.8 dl/g.

16. The thermoplastic resin composition according to claim 1 or 9, wherein the rubber-modified thermoplastic resin has a rubber content of 40-70% by weight and a grafting degree of 40% or more.

17. The thermoplastic resin composition according to claim 1, wherein the weight ratio of the rubber-modified thermoplastic resin (III) to the copolymer (I) is 25-45 to 75-55.

18. The thermoplastic resin composition according to claim 1, wherein said rubber-modified thermoplastic resin (III) is obtained by graft-copolymerizing 30-80 wt.% of a mixture of an aromatic alkenyl monomer and an alkenyl cyanide monomer and in addition another alkenyl monomer copolymerizable therewith on 20-70% by weight of said rubber.

19. The thermoplastic resin composition of claim 1, which further comprises a copolymer constituent (II) comprising, as its constituents, 50-74% by weight of α-methylstyrene, 26-33% by weight of an alkenyl cyanide and 0-24% by weight of another monomer copolymerizable therewith.

20. The thermoplastic resin composition according to claim 19, wherein the weight ratio of the heat-resistant copolymer (I) to the total of the heat-resistant copolymer (I) and the copolymer (II) is 0.4-1.

21. The thermoplastic resin composition according to claim 19, wherein the weight ratio of the heat-resistant copolymer (I) to the total of the heat-resistant copolymer (I) and the copolymer (II) is 0.4-0.8.

22. The thermoplastic resin composition according to claim 19, wherein the weight ratio of the copolymer (I) to the total of the copolymer (I) and the copolymer (II) is 0.55-0.75.

23. The thermoplastic resin composition according to claim 19, wherein the copolymer (II) consists of 60-72% by weight of α-methylstyrene, 28-31% by weight of acrylonitrile and 0-24% by weight of a monomer copolymerizable therewith.

24. The thermoplastic resin composition according to claim 19, wherein, in the copolymer (II) of (A) α-methylstyrene and (B) acrylonitrile, the ratio of the total of monomer chains ‑[(A)—(A)—(A)‑] and ‑[(A)—(A)—(B)‑] is 50% by weight or less of the total of said two monomer chains plus the remaining monomer chain: ‑[(B)—(A)—(B)‑].

25. The thermoplastic resin composition according to claim 19, wherein the intrinsic viscosity [η] of the copolymer (II), as measured in methyl ethyl ketone at 30° C., is 0.3–0.8 dl/g.

26. The thermoplastic resin composition according to claim 19, wherein the intrinsic viscosity [η] of the copolymer (II), as measured in methyl ethyl ketone at 30° C., is 0.35–0.7 dl/g.

27. The thermoplastic resin composition according to claim 1, wherein the rubber content in the entire composition is 10–30% by weight.

28. The thermoplastic resin composition according to claim 1, wherein the rubber content in the entire composition is 10–25% by weight.

29. The thermoplastic resin composition according to claim 1, wherein the remaining monomer content in the entire composition is 2,000 ppm or less.

30. The thermoplastic resin composition of claim 1, wherein said synthetic rubber is a member selected from the group consisting of polybutadiene, acrylonitrile-butadiene copolymer, styrene-butadiene copolymer, ethylene-propylene copolymer rubber, ethylene-propylene-ethylidene-norbornene copolymer rubber, acrylic rubber, natural rubber, polyisoprene and polychloroprene.

* * * * *